US009315685B2

(12) United States Patent
Lee et al.

(10) Patent No.: US 9,315,685 B2
(45) Date of Patent: *Apr. 19, 2016

(54) PROCESS FOR PREPARING AN AQUEOUS INK JET PRINTING INK (71) Applicant: Xerox Corporation, Norwalk, CT (US)

(72) Inventors: Frank Ping-Hay Lee, Oakville (CA); Marcel P. Breton, Mississauga (CA); Aurelian Valeriu Magdalinis, Aurora (CA); Michael J. D'Amato, Thornhill (CA); Biby Esther Abraham, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 91 days.

This patent is subject to a terminal disclaimer.

(21) Appl. No.: 14/256,939

(22) Filed: Apr. 19, 2014

(65) Prior Publication Data

US 2015/0299485 A1    Oct. 22, 2015

(51) Int. Cl.
*C09D 11/02* (2014.01)
*C09D 11/38* (2014.01)
*C08K 5/3417* (2006.01)
*C08K 5/20* (2006.01)
*C08K 5/23* (2006.01)
*C09D 191/06* (2006.01)
*C08K 9/08* (2006.01)

(52) U.S. Cl.
CPC . *C09D 11/38* (2013.01); *C08K 5/20* (2013.01); *C08K 5/23* (2013.01); *C08K 5/3417* (2013.01); *C08K 9/08* (2013.01); *C09D 191/06* (2013.01)

(58) Field of Classification Search
CPC .................................................. C09D 11/34
See application file for complete search history.

(56) References Cited

U.S. PATENT DOCUMENTS

| 5,184,783 | A | 2/1993 | Hockmeyer et al. |
| 5,389,958 | A | 2/1995 | Bui et al. |
| 5,497,948 | A | 3/1996 | Hockmeyer |
| 5,820,040 | A | 10/1998 | Hockmeyer et al. |

(Continued)

OTHER PUBLICATIONS

Frank Ping-Hay Lee, et al., U.S. Appl. No. 14/256,937, filed Apr. 19, 2014, "Pigmented Wax Dispersion and Method for Preparing Same," not yet published.

(Continued)

*Primary Examiner* — Veronica F Faison
(74) *Attorney, Agent, or Firm* — Marylou J. Lavoie, Esq. LLC (57) ABSTRACT

A process for preparing an aqueous ink composition including 1) preparing a colorant concentrate; 2) preparing a colorant wax dispersion by (a) melting and mixing a dry colorant with at least one wax to form a colorant concentrate, wherein the colorant concentrate contains at least 25 percent by weight of colorant; (b) milling the colorant concentrate of step (a) to form a milled colorant concentrate; (c) combining the milled colorant concentrate of (b) with water and dispersing to form a colorant wax dispersion comprising a plurality of colorant wax particles comprising a colorant core surrounded by a wax shell, wherein the colorant wax particles exhibit a particle size distribution of from about 150 nanometers to less than about 300 nanometers; wherein the melting and mixing of step (a) and the milling of step (b) is done in an immersion media mill; and wherein the combining of step (c) is done using a piston homogenizer; and 3) blending the colorant wax dispersion with an aqueous ink vehicle and optional ink additives to form an aqueous ink composition; and filtering the aqueous ink composition.

20 Claims, 5 Drawing Sheets

(56) References Cited

U.S. PATENT DOCUMENTS

| | | |
|---|---|---|
| 7,175,118 B2 | 2/2007 | Hockmeyer |
| 7,559,493 B1 | 7/2009 | Hockmeyer et al. |
| 7,828,234 B1 | 11/2010 | Hockmeyer et al. |
| 7,883,036 B1 | 2/2011 | Cullens et al. |
| 7,914,200 B1 | 3/2011 | Hockmeyer et al. |
| 7,973,186 B1 | 7/2011 | Goredema et al. |
| 8,182,133 B1 | 5/2012 | Hockmeyer et al. |
| 8,376,252 B1 | 2/2013 | Hockmeyer et al. |
| 2014/0356778 A1 | 12/2014 | Wolfe et al. |
| 2015/0013567 A1 | 1/2015 | Lopez et al. |

OTHER PUBLICATIONS

Frank Ping-Hay Lee, et al., U.S. Appl. No. 14/256,938, filed Apr. 19, 2014, "Aqueous Ink Jet Printing Ink," not yet published.

Frank Ping-Hay Lee, et al., U.S. Appl. No. 14/256,941, filed Apr. 19, 2014, "Toner Comprising Colorant Wax Dispersion," not yet published.

EPSON® PREMIUM PHOTO PAPER

FIG. 6

DIGITAL COLOR ELITE GLOSS®

FIG. 7

4200 PAPER SUBSTRATE

FIG. 8

EPSON® PREMIUM PHOTO PAPER

FIG. 9

DIGITAL COLOR ELITE GLOSS®

FIG. 10

4200 PAPER SUBSTRATE

FIG. 11

AQ INK-C2 EPSON® PHOTO PAPER

FIG. 12

AQ INK-C2 DCEG

FIG. 13

AQ INK-C2 4200

FIG. 14

PROCESS FOR PREPARING AN AQUEOUS INK JET PRINTING INK

RELATED APPLICATIONS

Commonly assigned U.S. patent application Ser. No. 14/256,937, entitled "Pigmented Wax Dispersion And Method For Preparing Same", filed concurrently herewith, is hereby incorporated by reference herein in its entirety.

Commonly assigned U.S. patent application Ser. No. 14/256,938, entitled "Aqueous Ink Jet Printing Ink", filed concurrently herewith, is hereby incorporated by reference herein in its entirety.

Commonly assigned U.S. patent application Ser. No. 14/256,941, entitled "Toner Comprising Colorant Wax Dispersion", filed concurrently herewith, is hereby incorporated by reference herein in its entirety.

BACKGROUND

Disclosed herein is a process for preparing an aqueous ink jet printing ink containing nano-pigmented wax particles or dyed wax particles for improved release and gloss properties and which are suitable for use with a broad of color and printing media.

Ink jet printing technology often comprises jetting of inks onto a transfix belt or drum, followed by transferring of the ink onto a printing medium, such as paper, under pressure. This is often referred to as transfer or transfix ink jet printing. Ink jet printing technology also often involves jetting of inks directly onto printing media, such as direct to paper printing.

Inks formulated for transfer or direct ink jet printing technologies can comprise aqueous dispersions of dyes or pigments dispersed to have an "average" particle or drop size D50 of less than about 150 nanometers and which are stabilized using a dispersant, plus other ingredients including lubricant, solvents and binders. "Average" particle or drop size is typically represented as $d_{50}$, or defined as the volume median particle size value at the 50th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of an individual drop of the discontinuous layer as derived from images of the particles generated by Transmission Electron Microscopy or from Dynamic Light Scattering measurements.

Pigments are typically heavier than water and tend to agglomerate and settle unless they are stabilized by a dispersant.

Challenges associated with designing inks for transfix printing technology include achieving desired ink adhesion and release of the ink to the transfix belt or drum. To achieve the desired adhesion and release performances, a non-stick printing plate, i.e. a "blanket" can be used and an application of a layer of starch, i.e. "Skin", and glycerol disposed to the transfix belt or drum before jetting inks.

Challenges associated with designing inks for direct-to-paper printing technology include the challenges related to printing onto different printing media, including coated paper, uncoated paper, or plastic, which can be hydrophilic or hydrophobic.

Inks are often jetted by print heads containing multiple nozzles. To prevent clogging of the nozzles, pigments require milling to achieve an acceptable particle size, typically to a D50 of less than about 130 nanometers and having a small standard deviation such as 1 nanometer. A long ink shelf life is desirable wherein the ink remains stable including having stable rheological properties over long periods of time. Pigments are denser than water. Inks manufactured with pigments rely on use of dispersants to prevent settling and agglomeration.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described herein is a process for preparing an aqueous ink composition comprising 1) preparing a colorant concentrate; 2) preparing a colorant wax dispersion by (a) melting and mixing a dry colorant with at least one wax to form a colorant concentrate, wherein the colorant concentrate contains at least 25 percent by weight of colorant; (b) milling the colorant concentrate of step (a) to form a milled colorant concentrate; (c) combining the milled colorant concentrate of (b) with water and dispersing to form a colorant wax dispersion comprising a plurality of colorant wax particles comprising a colorant core surrounded by a wax shell, wherein the colorant wax particles exhibit a particle size distribution of from about 150 nanometers to less than about 300 nanometers; wherein the melting and mixing of step (a) and the milling of step (b) is done in an immersion media mill or a horizontal mill; and wherein the combining of step (c) is done using a piston homogenizer; and 3) blending the colorant wax dispersion with an aqueous ink vehicle and optional ink additives to form an aqueous ink composition; and filtering the aqueous ink composition.

DETAILED DESCRIPTION

Methods including processes and equipment for preparing aqueous ink jet ink compositions containing pigmented wax or dyed wax particles are described. The aqueous inks herein are suitable for a variety of printing technologies, in embodiments, the aqueous inks herein are particularly suitable for thermal drop-on-demand or piezo drop-on-demand ink jet printing technologies. The process for preparing an aqueous ink composition comprises 1) preparing a colorant concentrate; 2) preparing a colorant wax dispersion by (a) melting and mixing a dry colorant with at least one wax to form a colorant concentrate, wherein the colorant concentrate contains at least 25 percent by weight of colorant; (b) milling the colorant concentrate of step (a) to form a milled colorant concentrate; (c) combining the milled colorant concentrate of (b) with water and dispersing to form a colorant wax dispersion comprising a plurality of colorant wax particles comprising a colorant core surrounded by a wax shell, wherein the colorant wax particles exhibit a particle size distribution of from about 150 nanometers to less than about 300 nanometers; wherein the melting and mixing of step (a) and the milling of step (b) is done in an immersion media mill or a horizontal mill; and wherein the combining of step (c) is done using a piston homogenizer; and 3) blending the colorant wax dispersion with an aqueous ink vehicle and optional ink additives to form an aqueous ink composition; and filtering the aqueous ink composition. Blending of step (3) can further comprise blending with a co-solvent. In embodiments, the melting and mixing of step (a) and the milling of step (b) is done in an immersion media mill; and wherein the combining of step (c) is done using a piston homogenizer Waxes typically have good release properties. In the present embodiments, colorants, are encapsulated in wax. In certain embodiments, the wax encapsulated pigments are provided. In other embodiments, wax encapsulated dyes are provided. The colorant, whether pigment or dye, is encapsulated in wax. The aqueous ink compositions prepared herein with wax encapsulated colorant, in embodiments wax encapsulated pigments or wax encapsulated dyes, exhibit improved transfer, in embodiments, complete transfer, to printing media, over previous similar inks that lack the instant wax encapsulated colorant. Waxes are usually lighter than pigments or water. The present process exploits this phenomenon employing wax encapsulated pigments which are less likely to settle than "bare" pigments, that is, pigments that are not encapsulated in wax. The present wax encapsulated pigments also exhibit reduced agglomeration over non-wax encapsulated pigments.

The process for preparing an aqueous ink composition comprises preparing a colorant concentrate; preparing a stable dispersion of nanometer sized colorant wax; ink blending; and filtration. In embodiments, the colorant concentrate is a pigment concentrate or a dye concentrate and the stable dispersion of nanometer sized colorant wax is a pigmented wax dispersion or a dye wax dispersion. The processes herein thus include preparing intermediates containing pigmented wax or dyed wax particles. The aqueous ink process comprises three main processes:

Process 1. Preparing a colorant concentrate, in embodiments a pigment concentrate or dye concentrate, in embodiments, using an immersion media mill;

Process 2. Preparing a pigmented wax dispersion or a dye wax dispersion suing a piston homogenizer; and Process 3. Preparing an aqueous ink jet ink composition using ink jet ink blending and filtration.

In embodiments, preparing the colorant concentrate comprises dispersing, milling, and stabilizing the colorant into a wax base.

In embodiments, preparing the colorant concentrate comprises wetting and dispersing or dissolving the colorant and an optional synergist into a molten wax.

Pigments can be milled to a Z-average or D50 of about 130 nanometers in diameter.

The particle size of the pigmented wax particles can be measured using any number of suitable Dynamic Light Scattering apparatuses, such as a Malvern Zetasizer. For instance, the Z-average particle size over time can be monitored to gauge the stability of the pigment particles while it is held at elevated temperatures, such as about 120° C. The pigmented wax particles have an average particle size of from about 80 to about 300 nanometers, or from about 100 to about 250 nanometers, or from about 170 to about 230 nanometers. In certain embodiments, wherein the pigmented wax particles exhibit a particle size distribution of from about 150 to less than about 230 nanometers or from about 150 to less than about 200 nanometers. In embodiments, the pigmented wax particles have a Z average particle size of about 200 nanometers. Average particle size can be measured in any suitable or desired way, such as with a Nanotrac™ 252 (Microtrac, Montgomeryville, Pa., USA) particle size analyzer.

The process for preparing the aqueous ink compositions herein comprise preparing colorant wax dispersions, in embodiments, pigmented wax dispersions or dye wax dispersions. In embodiments, the aqueous ink compositions comprise a dispersion of wax encapsulated colorant, in embodiments, pigment or dye, having a D50 of from about 140 nanometers to about 220 nanometers.

The wax dispersion can be prepared using a high-pressure piston homogenizer. In embodiments, the pigmented wax dispersions are prepared as described in U.S. patent application Ser. No. 14/256,937, which is hereby incorporated by reference herein in its entirety. In embodiments, the pigmented wax dispersion is an aqueous submicron pigmented wax dispersion including a plurality of pigmented wax particles comprising a pigment core surrounded by a wax shell, wherein the pigmented wax particles exhibit a particle size distribution of 150 nanometers to less than 300 nanometers.

The pigmented wax dispersion can be prepared by the process described in U.S. patent application Ser. No. 14/256, 937, including (a) melting and mixing a dry pigment with at least one wax to form a pigment concentrate, wherein the pigment concentrate contains at least 25 percent by weight of pigment; (b) milling the pigment concentrate of step (a) to form a milled pigment concentrate; (c) combining the milled pigment concentrate of (b) with water and dispersing to form a pigmented wax dispersion comprising a plurality of pigmented wax particles comprising a pigment core surrounded by a wax shell, wherein the pigmented wax particles exhibit a particle size distribution of 150 nanometers to less than about 300 nanometers; wherein the melting and mixing of step (a) and the milling of step (b) is done in an immersion media mill; and wherein the combining of step (c) is done using a piston homogenizer.

The present process for preparing a pigmented wax dispersion comprises (a) melting and mixing a dry pigment with at least one wax to form a pigment concentrate, wherein the pigment concentrate contains at least 25 percent by weight of pigment; (b) milling the pigment concentrate of step (a) to form a milled pigment concentrate; and (c) combining the milled pigment concentrate of (b) with water and dispersing to form a pigmented wax dispersion comprising a plurality of pigmented wax particles comprising a pigment core surrounded by a wax shell, wherein the pigmented wax particles exhibit a particle size distribution of from about 150 nanometers to less than about 300 nanometers; wherein the melting and mixing of step (a) and the milling of step (b) is done in an immersion media mill; and wherein the combining of step (c) is done using a piston homogenizer. The pigmented wax particles have an average particle size of from about 80 to about 300 nanometers, or from about 100 to about 250 nanometers, or from about 170 to about 230 nanometers. In certain embodiments, wherein the pigmented wax particles exhibit a particle size distribution of from about 150 to less than about 230 nanometers or from about 150 to less than about 200 nanometers. In embodiments, the pigmented wax particles have a Z average particle size of about 200 nanometers. Average particle size can be measured in any suitable or desired way, such as with a Nanotrac™ 252 (Microtrac, Montgomeryville, Pa., USA) particle size analyzer.

The pigment dispersion process can be carried out in any suitable or desired apparatus. In embodiments, the pigmented wax dispersion processes take place in the setting of a jacketed vessel surrounding a mill, in embodiments a jacketed vessel surrounding a basket mill or an immersion media mill. Generally, the mill comprises a vessel with a heating jacket, a disperser blade for mixing the phase change carrier and optional dispersant and later mixing the phase change carrier and optional dispersant and pigment to wet the pigment, or an immersion mill head (basket assembly) containing the grinding media, in embodiments, ceramic grinding media, for dispersing the pigment.

In one embodiment, all of the melting, mixing, wetting and dispersion takes place in the same vessel and the mixing blade is replaced by the immersion mill or basket mill. In another embodiment, the melting, mixing and wetting takes place in a different vessel and the wetted mixture is then transferred to the immersion mill.

In embodiments, the melting and mixing of step (a) and the milling of step (b) is done in an immersion media mill or a horizontal media mill In embodiments, the combining of step (c) is done using a piston homogenizer.

Advantages achieved by the present process including using an immersion media mill, in embodiments a Hockmeyer Immersion Media Mill, for wet pigment grinding include that the immersion media mill requires only one tank for pigment dispersion (wetting) and milling operations. Thus, a simplified process is provided. Previously, wet pigment grinding was done using a horizontal media mill which requires a feed tank, feed pump, and connecting piping for recirculating materials between the feed tank and the milling chamber. Further, the present process using an immersion media mill for steps (a) and (b) benefit in that the immersion media mill uses an overhead drive for supporting the milling basket and turning the impeller. This process can be operated at atmospheric pressure and does not require a mechanical seal for the drive shaft. A horizontal media mill operates under pressure of up to 100 psi and requires a mechanical seal for the drive shaft. A further advantage of the present process is that in an immersion media mill, milling takes place inside the immersion basket. Small milling baskets require small amounts of grinding media and less power to achieve higher impeller velocity.

Melting and mixing the dry pigment with at least one wax can be done using a high shear disperser blade or impeller attachment inside a jacketed vessel. The impeller rotational speed (rpm), tip speed (feet per second) and temperature can be any suitable or desired speed or temperature, in embodiments, at temperatures higher than 100° C., higher than 120° C., 100 to about 170° C., 110 to 170° C., or 110 to 160° C., an rpm of from about 500 to about 5,500 rpm, or 500 to about 5,000 rpm, or 3,000 to about 5,200 rpm, and a tip speed of 4 to 40 feet per second or 23 feet per second to 40 feet per second.

Melting and mixing the dry pigment with at least one wax can be done at any suitable or desired temperature. In embodiments, the melting and mixing of step (a) is done at a temperature of from about 90 to about 180° C., or from about 90 to about 170° C., or from about 100 to about 145° C., or from about 120 to about 140° C.

Melting and mixing the dry pigment with at least one wax can be done at any suitable or desired amount of time. In embodiments, the melting and mixing of step (a) is done for a period of from about 0.1 to about 10 hours, or from about 4 to about 10 hours, or from about 5 to about 8 hours, or from about 6 to about 7 hours. In a specific embodiment, melting and mixing of step (a) is done for a period of from about 1 to about 4 hours.

Mixing in step (a) can be done by any suitable or desired process. In embodiments, mixing of step (a) is done using a dispersion blade set at from about 500 to about 5,500 revolutions per minute, from about 1,500 to about 4,000 revolutions per minute, or from about 2,000 to about 3,000 revolutions per minute.

The milling of step (b) can be done using any suitable or desired process. In embodiments, milling of step (b) comprises a grinding step. An immersion mill or basket mill can be employed for the milling step (b). The basket mill can contain screens having suitable openings, such as 0.1 millimeter openings, on the side and bottom and can be filled with grinding media, such as ceramic grinding media, in embodiments, 0.3 millimeter diameter spherical zirconia grinding media. The basket mill can use an auger to draw the melt mixed pigment and wax particles into the mill. The centrifugal force exerted by the rotor and grinding media push the slurry out through the side and bottom screen. Milling can proceed for any suitable or desired time, in embodiments, for hours, until a desirable particle size distribution is achieved.

Any suitable or desired mill can be selected for the processes herein. In embodiments, the mill can be as described in U.S. Pat. No. 7,559,493, which is hereby incorporated by reference herein in its entirety. In embodiments, the process herein can be carried out using a Hockmeyer HCPN Dispermill®, available from Hockmeyer Equipment Corporation, which is a micro mill. This is an immersion mill including a vertical basket mill that utilizes grinding media to reduce the particle size of materials, such as for example, pigments. In further embodiments, the mill can be a mill as described in U.S. Pat. Nos. 5,184,783; 5,497,948; 5,820,040; 7,175,118; 7,559,493; 7,828,234; 7,883,036; 7,914,200; 8,182,133; or 8,376,252; each of which is hereby incorporated by reference herein in their entireties.

Any suitable or desired media milling material, such as beads or shot, can be included in the immersion mill head (basket assembly). In embodiments, 40 milliliters of 0.3 millimeter diameter zirconia is disposed in the mill head for the milling step.

In embodiments, the milling step (b) is done at a temperature of from about 90 to about 170° C., or from about 100 to about 145° C., or from about 120 to about 140° C.

Milling step (b) can be done for any suitable or desired amount of time, in embodiments, milling step (b) is done for a period of from about 0.1 to about 8 hours, or from about 1 to about 8 hours, or from about 2 to about 6 hours, or from about 3 to about 6 hours, or from about 3 to about 4 hours, or from about 2 to about 4 hours. In a specific embodiment, melting and mixing of step (a) is done for a period of from about 0.1 to about 4 hours.

The milled pigment concentrate of step (b) can be used immediately or stored for later use. In embodiments, the milled pigment concentrate of step (b) is discharged into aluminum trays.

The combining step (c) can be carried out by any suitable or desired process. In embodiments, the combining step (c) comprises (1) pre-homogenizing followed by (2) homogenizing. For example, in embodiments, the combining step (c) comprises (1) pre-homogenizing for a period of from about 0.1 to about 1.5 hours at a temperature of from about 90 to about 170° C., at from about 100 to about 1,000 rpm and about 300 to about 1,000 psi; followed by (2) homogenizing for a period of from about 0.5 to about 5 hours at a temperature of from about 90 to about 170° C., at from about 100 to about 1,000 rpm and about 4,000 to about 8,000 psi.

The process can further comprise (d) cooling the pigmented wax dispersion to any suitable or desired temperature; (e) filtering the pigmented wax dispersion; and (f) discharging the pigmented wax dispersion.

Cooling step (d) can comprises cooling the pigmented wax dispersion to any suitable or desired temperature; in embodiments, cooling to a temperature of from about 20 to about 50° C.

Filtering step (e) can be carried out by any suitable or desired process. In embodiments, filtering the pigmented wax dispersion comprising filtering through a filter having a filter size of from about 100 to about 300 micrometers. In embodiments, the pigmented wax dispersion can be filtered through a 150 micron nylon filter at temperature of 20 to about 50° C.

The pigmented wax dispersion particles provide small sized wax pigment dispersions. The particle size of the pigmented wax particles can be measured using any number of suitable Dynamic Light Scattering apparatuses, such as a Malvern Zetasizer. For instance, the Z-average particle size over time can be monitored to gauge the stability of the pigment particles while it is held at elevated temperatures, such as about 120° C. In embodiments, the pigmented wax particles herein hae a Z average particle size of from about 80 to about 300 nanometers, or from about 100 to about 250 nanometers, or from about 120 to about 230 nanometers or from about 170 to about 230 nanometers.

The pigmented wax dispersion can be present in the aqueous ink composition in any suitable or desired amount. In embodiments, the pigmented wax dispersion is present in the aqueous ink composition in an amount of from about 0 to about 70, or from about 10 to about 60, or from about 25 to about 45 percent by weight based on the total weight of the aqueous ink composition. If a dye based wax dispersion is used, the dye based wax dispersion can also be present in the aqueous ink in any suitable or desired amount. In embodiments, the dyed wax dispersion is present in the aqueous ink composition in an amount of from about 0 to about 70, or from about 10 to about 60, or from about 25 to about 45 percent by weight based on the total weight of the aqueous ink composition.

The aqueous ink compositions contain an aqueous liquid vehicle. The total amount of liquid vehicle can be provided in any suitable or desired amount. In embodiments, the liquid vehicle is present in the aqueous ink composition in an amount of from about 75 to about 97 percent, or from about 80 to about 95 percent, or from about 85 to about 95 percent, by weight, based on the total weight of the aqueous ink composition.

The ink compositions herein can consist solely of water, or can comprise a mixture of water and a water soluble or water miscible organic component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxypropionic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof. When mixtures of water and water soluble or miscible organic liquids are selected as the liquid vehicle, the water to organic ratio ranges can be any suitable or desired ration, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

In certain embodiments, the co-solvent is selected from the group consisting of sulfolane, methyl ethyl ketone, isopropanol, 2-pyrrolidinone, glycols, glycerol, diethylene glycol, ethylene glycol, polyethylene glycol, and mixtures thereof. The aqueous ink vehicle can include a co-solvent selected from two or more glycol type co-solvents.

In other embodiments, an aqueous ink composition herein comprises water; a co-solvent selected from two or more glycol type co-solvents; and an aqueous submicron wax dispersion comprising a plurality of colorant wax particles comprising a colorant core surrounded by a wax shell, wherein the colorant wax particles exhibit a particle size distribution of from about 150 nanometers to less than about 300 nanometers. In certain embodiments, the colorant is a pigment. In a specific embodiment, at least one of the glycol co-solvents is glycerol. In a specific embodiment, the co-solvents are glycerol and 1-3 propane diol; and the glycerol and 1-3 propane diol are present in a ratio of 6:1 to 1:2, respectively. In another specific embodiment, the co-solvents are glycerol and 1-3 propane diol and the glycerol and 1-3 propane diol are present in a ratio of 2:1 to 5:1, respectively, and the total amount of co-solvent is less than about 35 percent by weight based on the total weight of the ink and more than 10 percent by weight based on the total weight of the ink.

The total amount of liquid vehicle can be provided in any suitable or desired amount. In embodiments, the liquid vehicle is present in the stretchable in composition in an amount of from about 75 to about 97 percent, or from about 80 to about 95 percent, or from about 85 to about 95 percent, by weight, based on the total weight of the stretchable ink composition.

The pigmented wax dispersions herein can contain any suitable or desired pigment colorant. The colorant can be a pigment or a dye. In specific embodiments, the colorant is a pigment. In a specific embodiment, the colorant is a pigment selected from the group consisting of a magenta pigment, a cyan pigment, a yellow pigment, a black pigment, and mixtures and combinations thereof. The pigmented wax dispersions may be stabilized by synergists and dispersants. Thus, the colorant wax dispersion herein can further comprise a synergist, a dispersant, or a combination thereof.

Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

The pigmented wax dispersions can contain any suitable or desired wax. The wax will be selected in accordance with the desired end product.

In embodiments, the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

An aqueous submicron pigmented wax dispersion is thus provided comprising a plurality of pigmented wax particles comprising a pigment core surrounded by a wax shell, wherein the pigmented wax particles exhibit a particle size distribution of from about 150 nanometers to less than about 300 nanometers.

In embodiments, the aqueous submicron pigmented wax dispersion contains at least 25 percent by weight of pigment based on the total weight of the pigment and wax in the pigmented wax dispersion.

The aqueous submicron pigmented wax dispersion is a low viscosity dispersion, having a viscosity that is near that of water. In embodiments, the aqueous submicron pigmented wax dispersion has a viscosity of from about 1.2 to about 12 centipoise. In embodiments, the aqueous ink composition has a viscosity of from about 1.2 to about 12 centipoise at a temperature range of about 20° C. to about 40° C.

In embodiments, the stable aqueous dispersion of wax encapsulated pigment has a D50 of about 140 nanometers to about 220 nanometers, in embodiments, prepared using a high pressure piston homogenizer.

In embodiments, the wax used herein can have a melting point of from about 50° C. to about 100° C. In certain embodiments, the waxes can be polymethylene wax or polyethylene wax having different molecular weights and having a melting point of less about 60° C. to about 100° C. Solid content in the dispersion can vary. In embodiments, the pigmented wax dispersion has a solid content of from about 15 weight percent to about 35 weight percent pigment based on the total weight of the pigment dispersion.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethyl-stearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL C0-720™, IGEPAL C0-290™, IGEPAL CA-21O™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

The aqueous ink compositions herein comprising the pigmented wax particles or dyed wax particles possess improved release properties over previous aqueous ink compositions that do not contain the pigmented wax particles or dyed wax particles. Since pigments and dyes are encapsulated in wax, inks manufactured with the wax encapsulated pigments are more likely to transfer completely to paper with or without "skin". Since pigments are encapsulated in wax, they are less likely to agglomerate. In addition, wax encapsulated pigments are lighter than pigment (non wax encapsulated pigment or stand alone pigment), therefore, are less likely to settle.

Prints made with the present aqueous wax containing inks have improved gloss characteristics, exhibit a broader color latitude, and have a longer shelf life than inks not formulated with the wax encapsulated pigments or wax encapsulated dyes. The present aqueous ink compositions containing pigmented wax particle dispersions provide ink jet inks having significantly improved "release" efficiency when used with transfix ink jet printers and are suitable for a broad range of printing media.

In embodiments, aqueous ink compositions herein are provided containing dispersions of wax containing cyan, magenta, yellow, black or other custom colored pigments or dyes.

In embodiments, the ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, or from about 2 to about 30 cps at a temperature of about 30° C., although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 70° C., as high as about 50° C., or as high as about 40° C., although the jetting temperature can be outside of these ranges.

In certain embodiments, the ink compositions herein have a viscosity of from about 2 to about 20 centipoise at a jetting temperature of about 30 to about 50° C.

The ink compositions herein have selected surface tension characteristics that provide wetting and release properties suitable for indirect printing applications. In embodiments, the ink composition is selected to provide a surface tension, viscosity, and particle size that is suitable for use in a piezoelectric ink jet print head.

In embodiments, the ink composition herein has a surface tension of from about 15 to about 50 dynes per centimeter, or from about 18 to about 38 dynes per centime, or from about 20 to about 35 dynes per centimeter, although the surface tension can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of pigmented wax dispersion by (a) melting and mixing a dry pigment with at least one wax to form a pigment concentrate, wherein the pigment concentrate contains at least 25 percent by weight of pigment; (b) milling the pigment concentrate of step (a) to form a milled pigment concentrate; (c) combining the milled pigment concentrate of (b) with water and dispersing to form a pigmented wax dispersion comprising a plurality of pigmented wax particles comprising a pigment core surrounded by a wax shell, wherein the pigmented wax particles exhibit a particle size distribution of from about 150 nanometers to less than about 300 nanometers; 2) mixing of the pigmented wax dispersion with the aqueous ink vehicle; 4) optional filtering of the mixture; 5) addition of other components such as additional water, co-solvents, and optional additives; and 6) optional filtering of the composition.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In embodiments, a process herein comprises incorporating an ink prepared as disclosed herein into an ink jet printing apparatus, ejecting ink droplets in an imagewise pattern onto an intermediate transfer member, heating the image to partially or completely remove solvents, and transferring the ink in the imagewise pattern from the intermediate transfer member to a final recording substrate. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In a specific embodiment, a process of aqueous ink jet printing with an aqueous ink composition herein comprises incorporating an aqueous ink composition into an ink jet printing apparatus; wherein the aqueous ink composition comprises water; a co-solvent; and an aqueous submicron colorant wax dispersion comprising a plurality of colorant wax particles comprising a colorant core surrounded by a wax shell, wherein the colorant wax particles exhibit a particle size distribution of from about 150 nanometers to less than about 300 nanometers; ejecting droplets of ink in an imagewise pattern onto an intermediate transfer member; optionally, heating the image to partially or completely remove solvents; and transferring the ink in the imagewise pattern from the intermediate transfer member to a final recording substrate; or ejecting droplets of ink in an imagewise pattern directly onto a final image receiving substrate. In a certain embodiment, the colorant is a pigment. In another specific embodiment, at least one of the glycol co-solvents is glycerol. In yet another specific embodiment, the co-solvents are glycerol and 1-3 propane diol; and wherein the glycerol and 1-3 propane diol are present in a ratio of 6:1 to 1:2, respectively.

Any suitable substrate or recording sheet can be employed as the final recording sheet, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Figure 1:
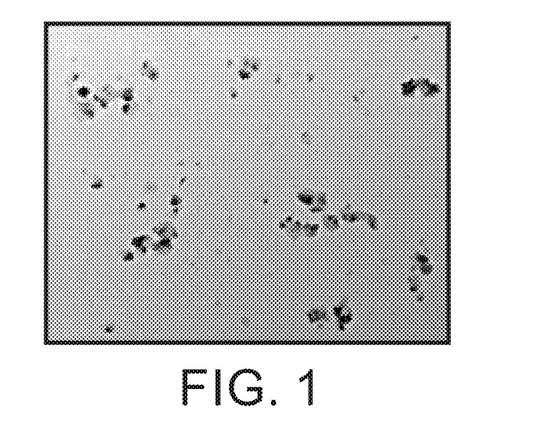
FIG. 1 is a transmission electron micrograph image of a pigmented wax dispersion in accordance with the present disclosure.
Figure 2:
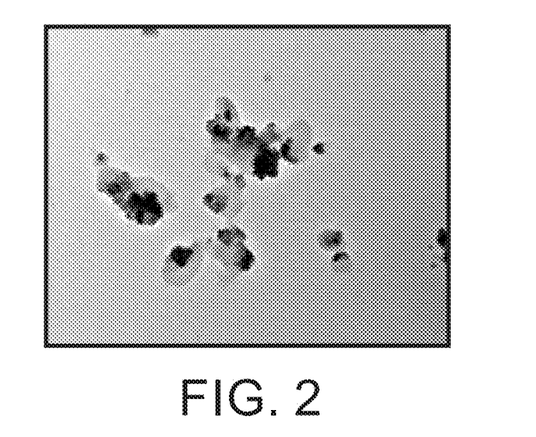
FIG. 2 is a transmission electron micrograph image of a pigmented wax dispersion in accordance with the present disclosure.

FIG. 1 is a transmission electron micrograph picture of a pigmented wax dispersion prepared with Cytech® FNP-80 wax (48.75 weight percent). FIG. 2 is a transmission electron micrograph picture of a pigmented wax dispersion prepared with Clariant® Cyan BG10 pigment (25 weight percent). The wax domain is about 200 nanometers with small pigment aggregate within each domain.

Example 1

Aqueous Cyan Ink Containing 2 Weight Percent Cyan Pigment. The components of Table 1 were mixed in the amounts shown in Table 1 to provide an aqueous cyan ink containing a cyan pigmented wax dispersion.

TABLE 1

| Chemical | Weight (%) | Quantity (g) |
|---|---|---|
| Cyan Pigmented Wax Dispersion containing 19.91% "Pigmented" wax particles (Cyan BG10 pigment: 25 wt. %, PEI-1: 20 wt. %, Sunflo ® SFD-B124: 6.25 wt. %, Cytech FNP-0080: 48.75%) | 40.2 | 40.2 |
| 1,3 Propanediol | 20.3 | 20.3 |
| Glycerol | 7.5 | 7.5 |
| Deionized water | 32.0 | 32.0 |
| Total | 100.0 | 100.0 |

PEI-1 is a polyethyleneimine dispersant, as described in U.S. Pat. No. 7,973,186, which is hereby incorporated by reference herein in its entirety, and which, in embodiments, is of the formula on the print. PIAS-II is the personal image Analysis system, a digital loupe and the high resolution optic module ~5 µm/pixel was used which has a field of view ~3.2 mm×2.4 mm to measure the dot size and the line widths.

PEI-1

Sunflo® SFD-B124 is a derivatized sulfonated copper phthalocyanine, available from Sun Chemical.

Cytech® FNP-0080 is a paraffin wax available from Cytec®.

Figure 3:
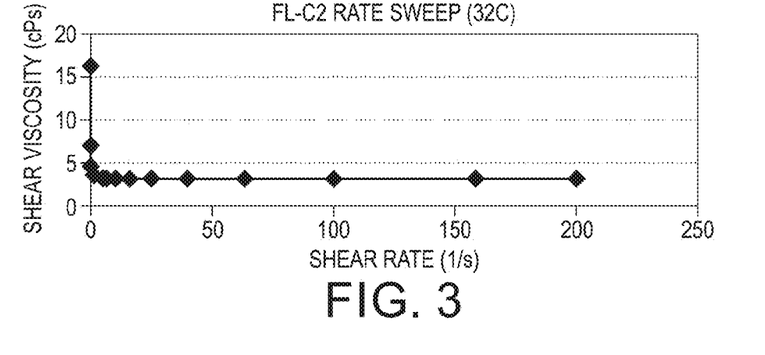
FIG. 3 is a rheology plot showing sheer viscosity (y axis) versus shear rate (x axis) for an aqueous ink composition in accordance with the present disclosure.
Figure 4:
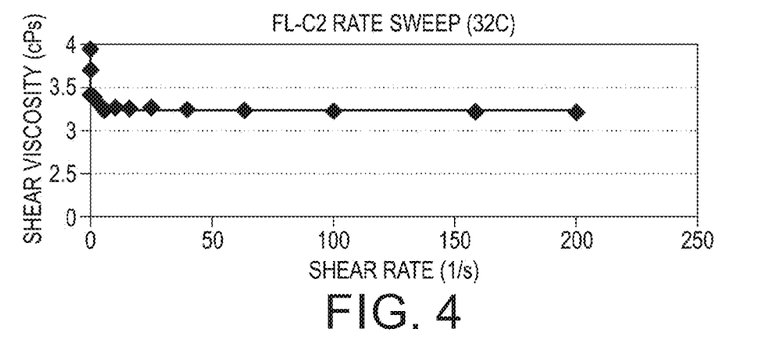
FIG. 4 is a rheology plot showing sheer viscosity (y axis) versus shear rate (x axis) for an aqueous ink composition in accordance with the present disclosure.
Figure 5:
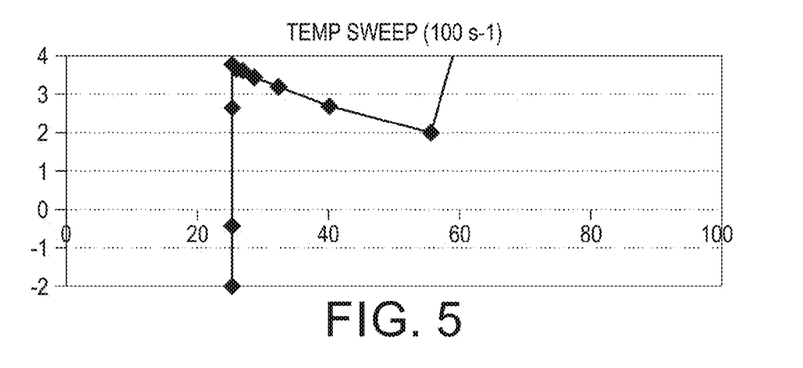
FIG. 5 is a rheology plot showing sheer viscosity (y axis) versus shear rate (x axis) for an aqueous ink composition in accordance with the present disclosure.

Rheology plots of the aqueous ink of Example 1 are shown in FIGS. 3, 4, and 5. The ink of Example 1 was formulated with 2 weight percent Clariant® Cyan BG10 pigment and 3.9 weight percent Cytech® FNP-80 wax. Inks can be formulated to have higher or lower viscocity for efficient jetting by with different printheads.

Example 2

Aqueous Magenta Ink Containing 2 Weight Percent Magenta Pigment. The components of Table 2 were mixed in the amounts shown in Table 2 to provide an aqueous magenta ink containing a magenta pigmented wax dispersion.

TABLE 2

| Chemical | Weight (%) | Quantity (g) |
|---|---|---|
| Magenta Pigmented Wax Dispersion containing 19.91% "Pigmented" wax particles (Magenta PR57:1 pigment: 30 wt. %, PEI-1: 18 wt. %, Cytech FNP-0080: 48%) | 33.5 | 33.5 |
| 1,3 Propanediol | 20.3 | 20.3 |
| Glycerol | 7.5 | 7.5 |
| Deionized water | 38.7 | 38.7 |
| Total | 100.0 | 100.0 |

Test prints were prepared with the ink of Example 1 using a Dimatix® printer.

The ink was printed on different substrates including Xerox® Digital Color Elite Gloss® Paper, Epson® Premium Photo Paper and the Xerox® 4200 paper substrate using the Dimatix® printer having the following test key parameters.

Test key parameters: Drop mass: 6.5 ng; Drop velocity: 8 m/s; Frequency: 5 KHz; Voltage: 19-24 V. After printing on the Digital color Elite gloss paper substrate and the 4200 paper substrate was dried in the oven @ 60° C. for two minutes.

The diameter of the printed dots after printing and spreading are shown in the Table 3. They were measured using the PIAS II and also an optical microscope (not contact) directly

TABLE 3

| Paper Substrate | Dot Size In Microns |
|---|---|
| Epson ® Premium Photo Paper | 33 |
| Xerox ® Digital Color Elite Gloss ® Paper | 37.9 |
| Xerox ® 4200 paper (uncoated) | 42.6 |

Figure 6:
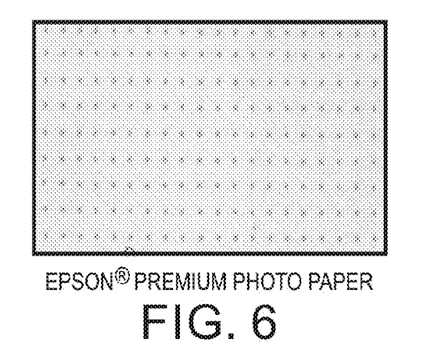
FIG. 6 is an image of printed dots printed with an aqueous ink composition in accordance with the present disclosure printed on a photo paper substrate.

FIG. 6 is an image of printed dots printed with an aqueous ink composition in accordance with the present disclosure printed on a photo paper substrate.

Figure 7:
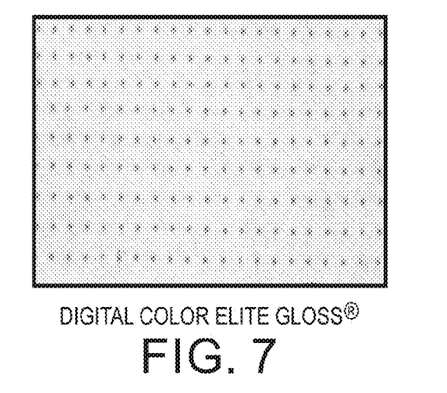
FIG. 7 is an image of printed dots printed with an aqueous ink composition in accordance with the present disclosure printed on Xerox® Digital Color Elite Gloss® Paper substrate.

FIG. 7 is an image of printed dots printed with an aqueous ink composition in accordance with the present disclosure printed on Xerox® Digital Color Elite Gloss® Paper substrate.

Figure 8:
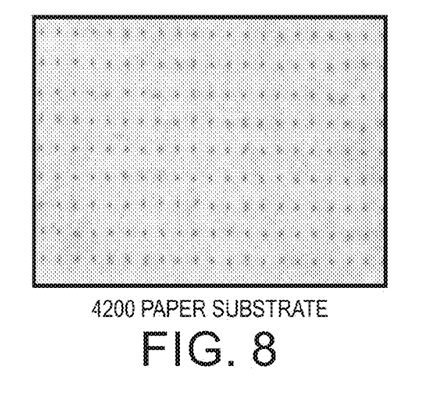
FIG. 8 is an image of printed dots printed with an aqueous ink composition in accordance with the present disclosure printed on Xerox® 4200 paper substrate.

FIG. 8 is an image of printed dots printed with an aqueous ink composition in accordance with the present disclosure printed on Xerox® 4200 paper substrate.

Table 4 shows the line width in microns in the ink of Example 1 printed in lines on the paper substrates.

TABLE 4

| Paper Substrate | Line Width In Microns |
|---|---|
| Epson ® Premium Photo Paper | 32 |
| Xerox ® Digital Color Elite Gloss ® Paper | 33 |
| Xerox ® 4200 paper (uncoated) | 37 |

Figure 9:
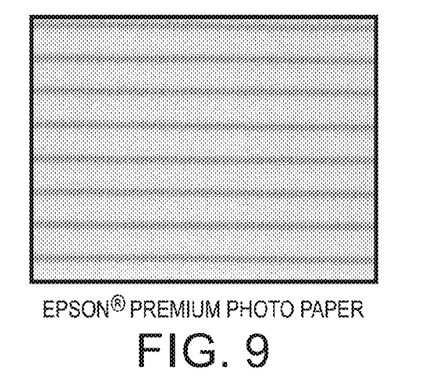
FIG. 9 is an image of printed lines printed with an aqueous ink composition in accordance with the present disclosure printed on a photo paper substrate.

FIG. 9 is an image of printed lines printed with the aqueous ink composition of Example 1 printed on a photo paper substrate.

Figure 10:
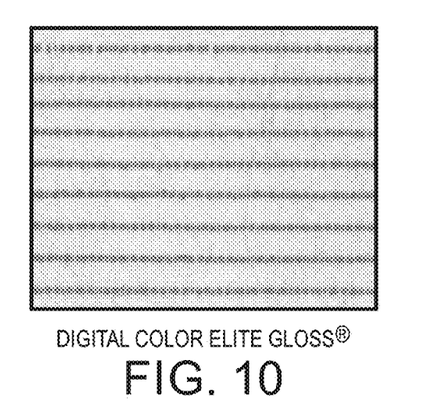
FIG. 10 is an image of printed lines printed with an aqueous ink composition in accordance with the present disclosure printed on Xerox® Digital Color Elite Gloss® Paper substrate.

FIG. 10 is an image of printed lines printed with the aqueous ink composition of Example 1 printed on Xerox® Digital Color Elite Gloss® Paper substrate.

Figure 11:
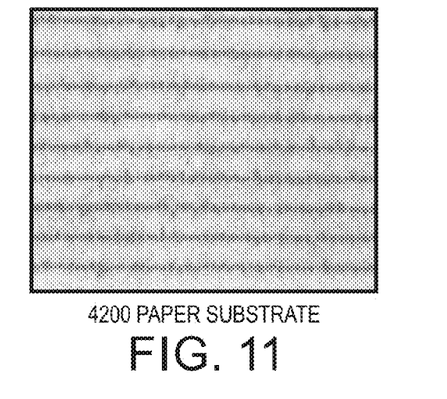
FIG. 11 is an image of printed lines printed with an aqueous ink composition in accordance with the present disclosure printed on Xerox® 4200 paper substrate.

FIG. 11 is an image of printed lines printed is an image of printed lines printed with the aqueous ink composition of Example 1 printed on Xerox® 4200 paper substrate.

Table 5 shows the optical microscope dot circularity of dots printed with the ink of Example 1 on the paper substrates.

Circularity was measured with a SYSMEX® FPIA-2100 flow-type histogram analyzer.

TABLE 5

| Paper Substrate | Circularity |
|---|---|
| Epson ® Premium Photo Paper | 0.88 |
| Xerox ® Digital Color Elite Gloss ® Paper | 0.82 |
| Xerox ® 4200 paper (uncoated) | 0.59 |

Figure 12:
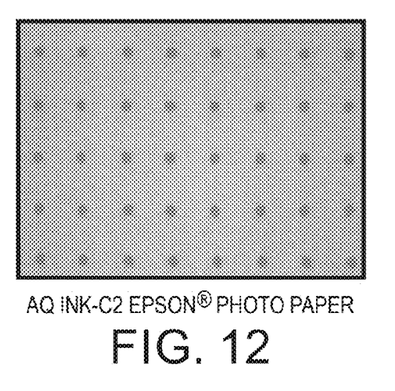
FIG. 12 is an image of printed dots showing circularity printed with an aqueous ink composition in accordance with the present disclosure printed on a photo paper substrate.

FIG. 12 is an image of printed dots showing circularity printed with the aqueous ink composition of Example 1 printed on a photo paper substrate.

Figure 13:
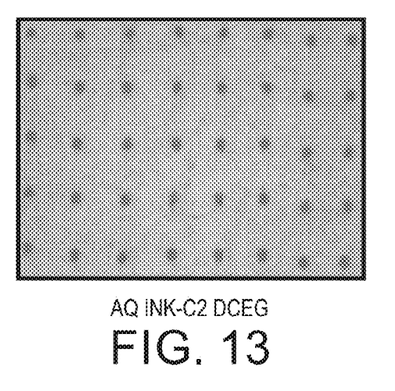
FIG. 13 is an image of printed dots showing circularity printed with an aqueous ink composition in accordance with the present disclosure printed on Xerox® Digital Color Elite Gloss® Paper substrate.

FIG. 13 is an image of printed dots showing circularity printed with the aqueous ink composition of Example 1 printed on Xerox® Digital Color Elite Gloss® Paper substrate.

Figure 14:
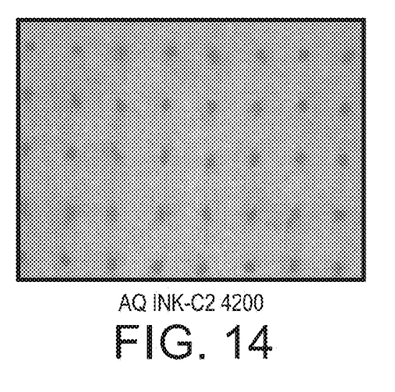
FIG. 14 is an image of printed dots showing circularity printed with an aqueous ink composition in accordance with the present disclosure printed on Xerox® 4200 paper substrate.

FIG. 14 is an image of printed dots showing circularity printed with the aqueous ink composition of Example 1 printed on Xerox® 4200 paper substrate.

Example 3

Preparation of Cyan Pigment Concentrate Containing 25 Weight Percent Clariant® Cyan BG10 Pigment.

TABLE 6

| Component | Weight Percent | Quantity (grams) |
|---|---|---|
| Clariant ® Cyan BG10 pigment | 25.00 | 400 |
| PEI-1 | 20.00 | 320 |
| Sunflo ® SFD-B124 | 6.25 | 100 |
| Cytech ® FNP-80 wax | 48.75 | 780 |
| Total | 100.00 | 1,600 |

The pigment concentrate was prepared by wetting and dispersing the pigment and synergist into molten wax and dispersant using a powder disperser, Hockmeyer high-shear disperser impeller, operated at tip speed of 10 to 15 meters per second. When the average particle size of the pigmented dropped to a desirable level, less than about 200 nanometers in diameter, the contents were milled using a Hockmeyer Model HCPN 1/16 Immersion Media Mill. A 0.2 millimeter milling basket filled with 0.3 millimeter zirconia grinding media was used for milling the pigment slurry. When the Z-average of the pigmented was milled to about 130 nanometers in diameter, and PDI (polydispersity index) was about 0.2, as measured by a Malvern Zetasizer particle size analyzer operating at 110° C., the milling step was considered completed. At room temperature, the produce is a stable solid containing fine pigment dispersed in wax. The product can be formed into pellets and stored indefinitely until ready for use.

Example 4

Preparation of Pigmented Wax Dispersion Using A Piston Homogenizer.

TABLE 7

| Component | Weight Percent | Mass (grams) |
|---|---|---|
| Cyan Pigment Concentrate of Example 3 | 19.91 | 597.2 |
| TAYCA POWER BN2060 Surfactant (60 percent solids) | 2.65 | 79.6 |
| Deionized Water | 77.44 | 2,323.2 |
| Total | 100 | 3,000 |

The cyan pigment of Example 3 was melted in water at about 120° C. The molten concentrate was dispersed using a 4 liter stainless steel, jacketed and stirred reactor connected to a piston homogenizer and stabilized pigmented wax particles were formed with surfactant. The process included melting of the pigment concentrate of Example 3 in water containing surfactant under pressure at 120 C. The slurry containing the molten pigment concentrate was then recirculated through the in-line piston homogenizer operating at a pressure of about 6,000 psig. The molten pigment concentrate experiences significant shear force when it passes through the ceramic piston inside the homogenizer and was dispersed into particles having a D50 of about 150 to about 250 nanometers. After recirculating, the contents through the homogenizer for a designated number of passes, the contents were cooled down and discharged as a liquid into a container. The process steps were as follows.

The Tayca Power surfactant was dissolved in the deionized water in a 2 Liter plastic bottle and stirred with a spatula until dissolved.

The pigment concentrate and surfactant solution were pre-homogenized using a reactor 01-08, Gaulin 15-MR, at 120° C. for 20 minutes at 500 rpm and 800 psi.

The pre-homogenized pigment concentrate and surfactant solution were then homogenized using a reactor 01-08, Gaulin 15-MR, at 120° C. for 45 minutes at 500 rpm and 6,000 psi.

The pigmented wax dispersion was then cooled and discharged at about 50° C. and filtered through a 100 micron nylon filter.

The product was a stable, homogenous aqueous dispersion of pigmented wax having an average particle size, D50, of about 150 nanometers to about 220 nanometers containing about 20 weight percent pigmented wax particles.

Example 5

Preparing of Aqueous cyan Ink Jet Ink Containing 2 Weight Percent Clariant® Cyan BG10 Pigment. Aqueous Ink Jet Ink Blending and Filtration. The final process comprises blending of ink components including pigmented wax dispersion, and filtration.

TABLE 8

| Component | Weight Percent | Quantity (grams) |
|---|---|---|
| Cyan Pigmented Wax Dispersion of Example 4 | 40.2 | 40.2 |
| 1,3-propanediol | 20.3 | 20.3 |
| Glycerol | 7.5 | 7.5 |
| Deionized Water | 32.0 | 32.0 |
| Total | 100 | 100 |

The aqueous ink components were combined in a glass beaker equipped with a magnetic stirrer. A sanitary stainless steel stirred tank can be used for large scale manufacturing of the instant aqueous ink compositions. The raw materials as shown in Table 8 were metered in the mixing vessel. The raw materials can include the pigmented wax dispersion, lubricants, viscosity adjuster, bactericide, and other optional additives. After the ink ingredients were added, the contents were blended until they became a homogeneous mixture. The product was then filtered through one or more filter membranes. The membrane is selected based on the type of print head. For example, for certain applications, the aqueous ink composition is filtered through a 0.7 micron filter membrane. The filtered aqueous ink is then ready to use.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process for preparing an aqueous ink composition comprising:
   1) preparing a colorant concentrate;
   2) preparing a colorant wax dispersion by (a) melting and mixing a dry colorant with at least one wax to form a colorant concentrate, wherein the colorant concentrate contains at least 25 percent by weight of colorant; (b) milling the colorant concentrate of step (a) to form a milled colorant concentrate; (c) combining the milled colorant concentrate of (b) with water and dispersing to form a colorant wax dispersion comprising a plurality of colorant wax particles comprising a colorant core surrounded by a wax shell, wherein the colorant wax particles exhibit a particle size distribution of from about 150 nanometers to less than about 300 nanometers; wherein the melting and mixing of step (a) and the milling of step (b) is done in an immersion media mill or a horizontal mill; and wherein the combining of step (c) is done using a piston homogenizer; and
   3) blending the colorant wax dispersion with an aqueous ink vehicle and optional ink additives to form an aqueous ink composition; and filtering the aqueous ink composition.

2. The process of claim 1, wherein the colorant concentrate is a pigment concentrate.

3. The process of claim 1, wherein the colorant concentrate is a dye concentrate.

4. The process of claim 1, wherein preparing the colorant concentrate comprises wetting and dispersing or dissolving the colorant and an optional synergist into a molten wax.

5. The process of claim 1, wherein the melting and mixing of step (a) and the milling of step (b) is done in an immersion media mill.

6. The process of claim 1, wherein the melting and mixing of step (a) is done at a temperature of from about 90 to about 180° C.

7. The process of claim 1, wherein the melting and mixing of step (a) is done for a period of from about 1 to about 4 hours.

8. The process of claim 1, wherein the milling of step (b) is done at a temperature of from about 90 to about 170° C.

9. The process of claim 1, wherein the aqueous ink vehicle includes a co-solvent selected from the group consisting of sulfolane, methyl ethyl ketone, isopropanol, 2-pyrrolidinone, glycols, glycerol, diethylene glycol, ethylene glycol, and mixtures thereof.

10. The process of claim 1, wherein the aqueous ink vehicle includes a co-solvent selected from two or more glycol type co-solvents.

11. The process of claim 1, wherein the colorant wax dispersion is an aqueous submicron pigmented wax dispersion containing at least 25 percent by weight of pigment based on the total weight of the pigment and wax in the pigmented wax dispersion.

12. The process of claim 1, wherein the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

13. The process of claim 1, wherein blending of step 3) further comprises blending with a co-solvent.

14. The process of claim 1, wherein the colorant comprises pigmented wax particles have a Z average particle size of about 200 nanometers.

15. The process of claim 1, wherein the colorant is a pigment selected from the group consisting of a magenta pigment, a cyan pigment, a yellow pigment, a black pigment, and mixtures and combinations thereof.

16. The process of claim 1, wherein the colorant wax dispersion further comprises a synergist, a dispersant, or a combination thereof.

17. The process of claim 1, wherein the aqueous ink composition has a viscosity of from about 1.2 to about 12 centipoise at a temperature range of about 20° C. to about 40° C.

18. The process of claim 1, wherein the aqueous ink composition has a surface tension of from about 15 to about 50 dynes per centimeter.

19. The process of claim 1, wherein the aqueous ink composition has a viscosity of from about 2 to about 20 centipoise at a jetting temperature of from about 30° C. to about 50° C.

20. The process of claim 1, wherein the combining of step (c) comprises (1) pre-homogenizing for a period of from about 0.1 to about 1.5 hours at a temperature of from about 90 to about 170° C., at from about 100 to about 1,000 rpm and about 300 to about 1,000 psi; followed by (2) homogenizing for a period of from about 0.5 to about 5 hours at a temperature of from about 90 to about 170° C., at from about 100 to about 1,000 rpm and about 4,000 to about 8,000 psi.

* * * * *